US012118934B2

(12) United States Patent
Yu et al.

(10) Patent No.: US 12,118,934 B2
(45) Date of Patent: Oct. 15, 2024

(54) DISPLAY DEVICE

(71) Applicant: LG DISPLAY CO., LTD., Seoul (KR)

(72) Inventors: UnSang Yu, Paju-si (KR); Bongchoon Kwak, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 17/884,319

(22) Filed: Aug. 9, 2022

(65) Prior Publication Data

US 2023/0078752 A1 Mar. 16, 2023

(30) Foreign Application Priority Data

Sep. 10, 2021 (KR) ........................ 10-2021-0120748

(51) Int. Cl.
*G09G 3/3233* (2016.01)

(52) U.S. Cl.
CPC ... *G09G 3/3233* (2013.01); *G09G 2300/0819* (2013.01); *G09G 2300/0852* (2013.01); *G09G 2300/0861* (2013.01); *G09G 2320/0242* (2013.01); *G09G 2320/029* (2013.01); *G09G 2330/10* (2013.01)

(58) Field of Classification Search
None
See application file for complete search history.

(56) References Cited

U.S. PATENT DOCUMENTS

2006/0066598 A1* 3/2006 Floyd ........................ G09G 3/20
345/204
2012/0050350 A1* 3/2012 Matsui ................. G09G 3/3233
345/77
2012/0132995 A1* 5/2012 Cheng ................. H01L 27/0288
257/363
2015/0213756 A1* 7/2015 Wacyk ................. G09G 3/3225
438/34
2017/0345368 A1* 11/2017 Kim ...................... G09G 3/3233
2017/0352321 A1* 12/2017 Hodges .................. H10K 71/70
2019/0012965 A1* 1/2019 Fu ......................... H10K 59/131
2021/0020729 A1* 1/2021 Kitakado ............... H10K 50/00
2022/0199605 A1* 6/2022 Chaji ....................... G09G 3/32

* cited by examiner

*Primary Examiner* — Benjamin C Lee
*Assistant Examiner* — Emily J Frank
(74) *Attorney, Agent, or Firm* — POLSINELLI PC

(57) ABSTRACT

A display device, by detecting a subpixel which is a defect by using an electronic fuse electrically connected to a driving transistor disposed on a subpixel and performing a repair, a display device being capable of detecting a defect and repairing by a circuit driving of the subpixel can be provided. Thus, even in the case that a repair by a physical method is not possible according to types of the display device, by detecting a defect of the subpixel and performing a repair, an image quality deterioration due to the defect of the subpixel can be prevented.

14 Claims, 12 Drawing Sheets

SP – Case A

SP - Case A (P1, Sensing)

<EX 1>

<EX 2>

SP - Case B (P1, Sensing)

<EX 1>

<EX 2>

SP - Case B (P2, Repair)

DISPLAY DEVICE

CROSS-REFERENCE TO RELATED APPLICATION

This application claims the priority of Korea Patent Application No. 10-2021-0120748, filed on Sep. 10, 2021, which is hereby incorporated by reference in its entirety.

BACKGROUND

Field of the Disclosure

The present disclosure relates to a display device.

Description of the Background

The growth of the information society leads to increased demand for display devices to display images and use of various types of display devices, such as liquid crystal display devices, organic light emitting display devices, etc.

The display devices include a display panel in which a plurality of subpixels are disposed, and various driving circuits for driving the plurality of subpixels.

Some of the plurality of subpixels disposed in the display panel can be defective in a manufacturing process or a driving process.

In the case that the subpixel which is a defect is present among subpixels disposed in the display panel, an image quality that the display panel displays may be deteriorated. Thus, methods of preventing an image quality deterioration due to an occurrence of the defective subpixel are required.

SUMMARY

Accordingly, the present disclosure is to provide a display device being capable of detecting and repairing a defect of a subpixel disposed in a display panel easily and preventing an image quality deterioration due to the defect of the subpixel.

Additional features and advantages of the disclosure will be set forth in the description which follows and in part will be apparent from the description, or may be learned by practice of the disclosure. Other advantages of the present disclosure will be realized and attained by the structure particularly pointed out in the written description and claims hereof as well as the appended drawings.

To achieve these and other advantages and in accordance with the present disclosure, as embodied and broadly described, a display device includes a plurality of subpixels disposed on an active area of a display panel, a light-emitting element disposed on each of the plurality of subpixels and including a first electrode and a second electrode, a driving transistor configured to control a driving current supplied to the light-emitting element, and an electronic fuse electrically connected between the driving transistor and the first electrode of the light-emitting element.

In another aspect of the present disclosure, a display device includes a plurality of subpixels disposed on an active area of a display panel, a light-emitting element disposed on each of the plurality of subpixels, a driving transistor configured to control a driving current supplied to the light-emitting element, a capacitor comprising a first capacitor electrode electrically connected to a gate node of the driving transistor and a second capacitor electrode electrically connected to a source node of the driving transistor, and an electronic fuse electrically connected to the gate node of the driving transistor.

In a further aspect of the present disclosure, a display device includes a first subpixel including a first light-emitting element, a first driving transistor configured to drive the first light-emitting element, and a first electronic fuse electrically connected to the first driving transistor, and a second subpixel including a second light-emitting element, a second driving transistor configured to drive the second light-emitting element, and a second electronic fuse electrically connected to the second driving transistor and being open, wherein an anode electrode of the second light-emitting element is insulated from an anode electrode of the first light-emitting element.

According to various aspects of the present disclosure, by performing a repair of a subpixel which is a defect easily by using an electronic fuse connected to a driving transistor disposed on a subpixel, an image quality drop due to the defect of the subpixel occurring in a manufacturing process or a driving process can be prevented.

It is to be understood that both the foregoing general description and the following detailed description are exemplary and explanatory and are intended to provide further explanation of the disclosure as claimed.

BRIEF DESCRIPTION OF THE DRAWINGS

The above and other features and advantages of the present disclosure will be more clearly understood from the following detailed description, taken in conjunction with the accompanying drawings, in which.

DETAILED DESCRIPTION

Figure 1:
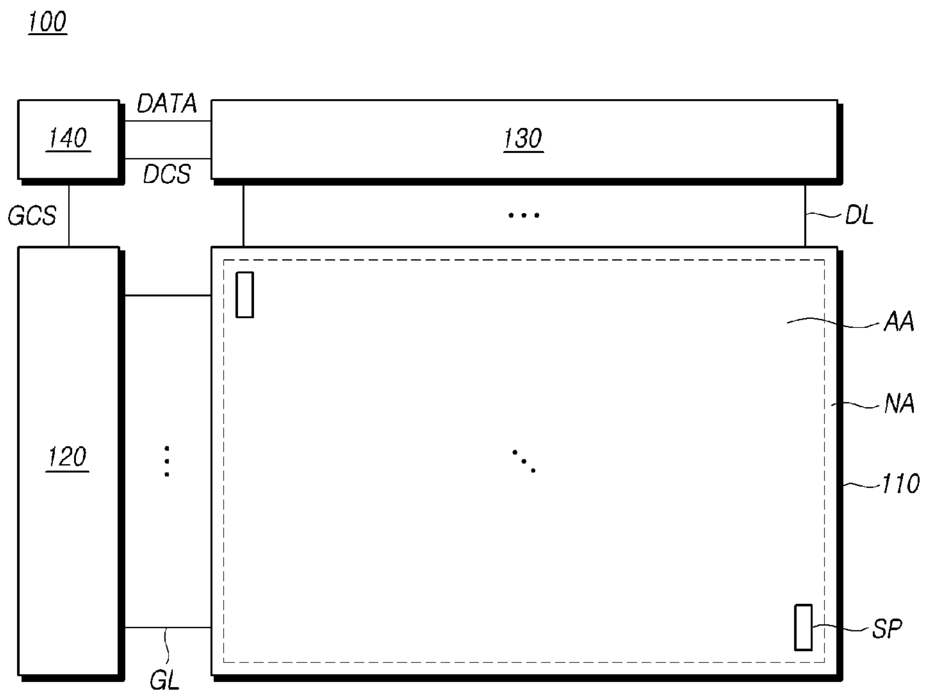
FIG. 1 is a diagram schematically illustrating a configuration of a display device according to aspects of the present disclosure.

In the following description of examples or aspects of the present disclosure, reference will be made to the accompanying drawings in which it is shown by way of illustration specific examples or aspects that can be implemented, and in which the same reference numerals and signs can be used to designate the same or like components even when they are shown in different accompanying drawings from one another. Further, in the following description of examples or aspects of the present disclosure, detailed descriptions of well-known functions and components incorporated herein will be omitted when it is determined that the description may make the subject matter in some aspects of the present disclosure rather unclear. The terms such as “including”, “having”, “containing”, “constituting” “make up of”, and “formed of” used herein are generally intended to allow other components to be added unless the terms are used with the term “only”. As used herein, singular forms are intended to include plural forms unless the context clearly indicates otherwise.

Terms, such as “first”, “second”, “A”, “B”, “(A)”, or “(B)” may be used herein to describe elements of the present disclosure. Each of these terms is not used to define essence, order, sequence, or number of elements etc., but is used merely to distinguish the corresponding element from other elements.

When it is mentioned that a first element “is connected or coupled to”, “contacts or overlaps” etc. a second element, it should be interpreted that, not only can the first element “be directly connected or coupled to” or “directly contact or overlap” the second element, but a third element can also be “interposed” between the first and second elements, or the first and second elements can “be connected or coupled to”, “contact or overlap”, etc. each other via a fourth element. Here, the second element may be included in at least one of two or more elements that “are connected or coupled to”, “contact or overlap”, etc. each other.

When time relative terms, such as “after,” “subsequent to,” “next,” “before,” and the like, are used to describe processes or operations of elements or configurations, or flows or steps in operating, processing, manufacturing methods, these terms may be used to describe non-consecutive or non-sequential processes or operations unless the term “directly” or “immediately” is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term “may” fully encompasses all the meanings of the term “can”.

Hereinafter, various aspects of the present disclosure will be described in detail with reference to accompanying drawings.

FIG. 1 is a diagram schematically illustrating a configuration of a display device 100 according to aspects of the present disclosure. All the components of the display device 100 according to the present disclosure are operatively coupled and configured.

Referring to FIG. 1, the display device 100 can include a display panel 110, and a gate driving circuit 120, a data driving circuit 130 and a controller 140 for driving the display panel 110.

The display panel 110 can include an active area AA where a plurality of subpixels SP is disposed, and a non-active area NA which is located outside the active area AA.

A plurality of gate lines GL and a plurality of data lines DL can be arranged on the display panel 110. The plurality of subpixels SP can be located in areas where the gate lines GL and the data lines DL intersect each other.

The gate driving circuit 120 is controlled by the controller 140, and sequentially outputs scan signals to the plurality of gate lines GL arranged on the display panel 110, thereby controlling the driving timing of the plurality of subpixels SP.

The gate driving circuit 120 can include one or more gate driver integrated circuits GDIC, and can be located only at one side of the display panel 110, or can be located at both sides thereof according to a driving method.

Each gate driver integrated circuit GDIC can be connected to a bonding pad of the display panel 110 by a tape automated bonding TAB method or a chip-on-glass COG method. Alternatively, each gate driver integrated circuit GDIC can be implemented by a gate-in-panel GIP method to then be directly arranged on the display panel 110. Alternatively, the gate driver integrated circuit GDIC can be integrated and arranged on the display panel 110. Alternatively, each gate driver integrated circuit GDIC can be implemented by a chip-on-film COF method in which an element is mounted on a film connected to the display panel 110.

The data driving circuit 130 receives image data from the controller 140 and converts the image data into an analog data voltage. Then, the data driving circuit 130 outputs the data voltage to each data line DL according to the timing at which the scan signal is applied through the gate line GL so that each of the plurality of subpixels SP emits light having brightness according to the image data.

The data driving circuit 130 can include one or more source driver integrated circuits SDIC.

Each source driver integrated circuit SDIC can include a shift register, a latch circuit, a digital-to-analog converter, an output buffer, and the like.

Each source driver integrated circuit SDIC can be connected to a bonding pad of the display panel 110 by a tape automated bonding TAB method or a chip-on-glass COG method. Alternatively, each source driver integrated circuit SDIC can be directly disposed on the display panel 110. Alternatively, the source driver integrated circuit SDIC can be integrated and arranged on the display panel 110. Alternatively, each source driver integrated circuit SDIC can be implemented by a chip-on-film COF method. In this case, each source driver integrated circuit SDIC can be mounted on a film connected to the display panel 110, and can be electrically connected to the display panel 110 through wires on the film.

The controller 140 can supply various control signals to the gate driving circuit 120 and the data driving circuit 130, and can control the operation of the gate driving circuit 120 and the data driving circuit 130.

The controller 140 can be mounted on a printed circuit board, a flexible printed circuit, or the like, and can be electrically connected to the gate driving circuit 120 and the data driving circuit 130 through the printed circuit board, the flexible printed circuit, or the like.

The controller 140 can allow the gate driving circuit 120 to output a scan signal according to the timing implemented in each frame. The controller 140 can convert a data signal received from the outside to conform to the data signal format used in the data driving circuit 130 and then output the converted image data to the data driving circuit 130.

The controller 140 receives, from the outside (e.g., a host system), various timing signals including a vertical synchronization signal VSYNC, a horizontal synchronization signal HSYNC, an input data enable DE signal, a clock signal CLK, and the like, as well as the image data.

The controller 140 can generate various control signals using various timing signals received from the outside, and can output the control signals to the gate driving circuit 120 and the data driving circuit 130.

For example, in order to control the gate driving circuit 120, the controller 140 can output various gate control signals GCS including a gate start pulse GSP, a gate shift clock GSC, a gate output enable signal GOE, or the like.

The gate start pulse GSP controls operation start timing of one or more gate driver integrated circuits GDIC constituting the gate driving circuit 120. The gate shift clock GSC, which is a clock signal commonly input to one or more gate driver integrated circuits GDIC, controls the shift timing of a scan signal. The gate output enable signal GOE specifies timing information on one or more gate driver integrated circuits GDIC.

In addition, in order to control the data driving circuit 130, the controller 140 can output various data control signals DCS including a source start pulse SSP, a source sampling clock SSC, a source output enable signal SOE, or the like.

The source start pulse SSP controls a data sampling start timing of one or more source driver integrated circuits SDIC constituting the data driving circuit 130. The source sampling clock SSC is a clock signal for controlling the timing of sampling data in the respective source driver integrated circuits SDIC. The source output enable signal SOE controls the output timing of the data driving circuit 130.

The display device 100 can further include a power management integrated circuit for supplying various voltages or currents to the display panel 110, the gate driving circuit 120, the data driving circuit 130, and the like or controlling various voltages or currents to be supplied thereto.

Each subpixels SP can be an area defined by a cross of the gate line GL and the data line DL, and at least one circuit element including an element emitting a light can be disposed on the subpixel SP.

For example, in the case that the display device 100 is an organic light-emitting display device, an organic light-emitting diode OLED and various circuit elements can be disposed on the plurality of subpixel SP. By controlling a current supplied to the organic light-emitting diode OLED by the various circuit elements, each subpixel can represent a luminance corresponding to the image data.

Alternatively, in some cases, a light-emitting diode LED or micro light-emitting diode μLED can be disposed on the subpixel SP.

Figure 2:
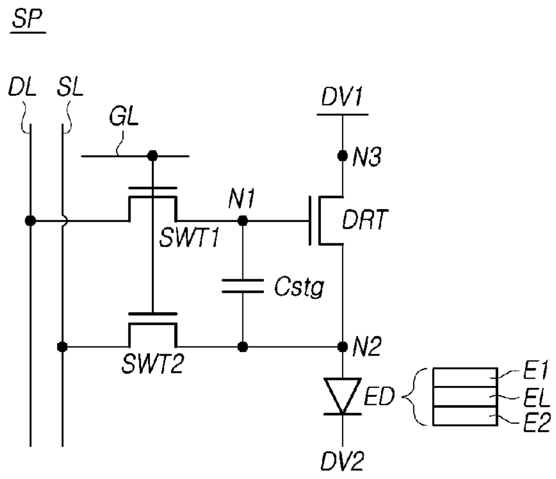
FIG. 2 is a diagram illustrating an example of a circuit structure of a subpixel included in a display device according to aspects of the present disclosure.

FIG. 2 is a diagram illustrating an example of a circuit structure of the subpixel SP included in the display device 100 according to aspects of the present disclosure.

Referring to FIG. 2, a light-emitting element ED and a driving transistor DRT for driving the light-emitting element ED can be disposed on the subpixel SP. Furthermore, at least one circuit elements other than the light-emitting element ED and the driving transistor DRT can be further disposed on the subpixel SP.

For example, such as an example illustrated in FIG. 2, a first switching transistor SWT1, a second switching transistor SWT2 and a storage capacitor Cstg can be further disposed on the subpixel SP.

An example illustrated in FIG. 2 exemplary illustrates 3T1C structure that three thin film transistors and one capacitor other than the light-emitting element ED are disposed on the subpixel SP, but aspects of the present disclosure are not limited to this. Furthermore, an example illustrated in FIG. 2 exemplary illustrates the case that all of thin film transistors are N type, but in some cases, the thin film transistor disposed on the subpixel SP can be P type.

The first switching transistor SWT1 can be electrically connected between the data line DL and a first node N1. The data voltage can be supplied to the subpixel SP through the data line DL. The first node N1 can be a gate node of the driving transistor DRT.

The first switching transistor SWT1 can be controlled by a scan signal supplied to the gate line GL. The first switching transistor SWT1 can control that the data voltage supplied through the data line DL is applied to the gate node of the driving transistor DRT.

The driving transistor DRT can be electrically connected between a line that a first driving voltage DV1 is applied and the light-emitting element ED. The first driving voltage DV1 can be supplied to a third node N3 of the driving transistor DRT. The first driving voltage DV1 can be a high potential driving voltage. The third node N3 can be a drain node or a source node of the driving transistor DRT.

The driving transistor DRT can be controlled by a voltage applied to the first node N1. And the driving transistor DRT can control a driving current supplied to the light-emitting element ED.

The second switching transistor SWT2 can be electrically connected between a sensing line SL and a second node N2. A reference voltage can be supplied to the second node N2 through the sensing line SL. The second node N2 can be the source node or the drain node of the driving transistor DRT.

The second switching transistor SWT2 can be controlled by the scan signal supplied to the gate line GL. The gate line GL controlling the second switching transistor SWT2 can be identical to or different from the gate line GL controlling the first switching transistor SWT1.

The second switching transistor SWT2 can control that the reference voltage is applied to the second node N2. Furthermore, the second switching transistor SWT2, in some cases, can control that a voltage of the second node N2 is sensed through the sensing line SL.

The storage capacitor Cstg can be electrically connected between the first node N1 and the second node N2. The storage capacitor Cstg can maintain the data voltage applied to the first node N1 for one frame.

The light-emitting element ED can be electrically connected between the second node N2 and a line that a second driving voltage DV2 is supplied. The second driving voltage DV2 can be a low potential driving voltage.

The light-emitting element ED can include a first electrode E1, a second electrode E2 and a light-emitting layer EL disposed between the first electrode E1 and the second electrode E2.

The light-emitting element ED can represent a luminance according to the driving current supplied through the driving transistor DRT.

Such as described above, the light-emitting element ED disposed on the subpixel SP can be controlled by a plurality of circuit elements included in the subpixel SP and can represent a luminance according to an image data.

In the case that abnormality of some of the plurality of circuit elements including the light-emitting element ED disposed on the subpixel SP is occurred, the subpixel SP can become a state being a defect. In this case, the light-emitting element ED disposed on the subpixel SP may not be controlled accurately and may not represent a luminance corresponding to the image data.

Aspects of the present disclosure can provide methods being capable of detecting and repairing a defect of the subpixel SP easily in the case that the defect of the subpixel SP is occurred, and preventing that a drop of an image quality that the display panel 110 displays is occurred due to the subpixel SP which is a defect.

Figure 3:
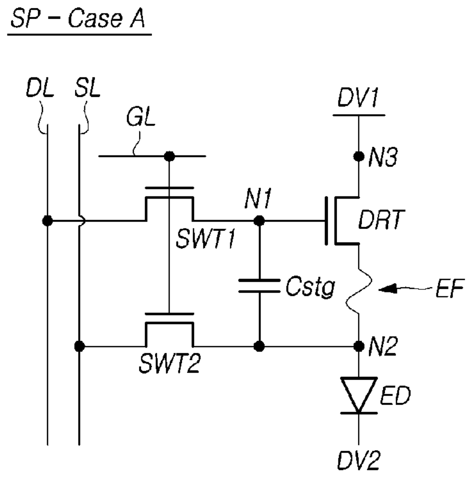
FIG. 3 is diagram illustrating another example of a circuit structure of a subpixel included in a display device according to aspects of the present disclosure.
Figure 4:
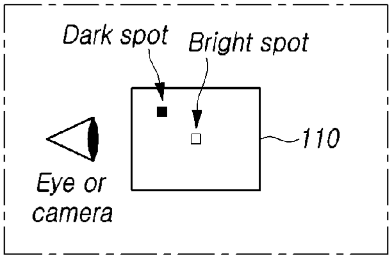
FIGS. 4 to 6 are diagrams illustrating an example of a method performing a repair of a subpixel illustrated in FIG. 3.
Figure 4:
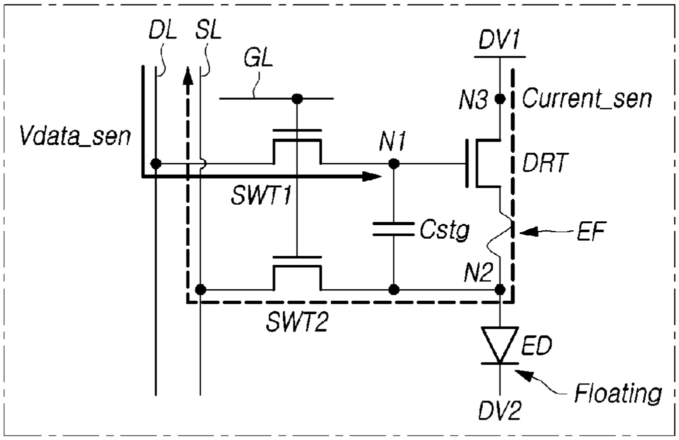

FIG. 3 is diagram illustrating another example of a circuit structure of the subpixel SP included in the display device 100 according to aspects of the present disclosure. FIGS. 4 to 6 are diagrams illustrating an example of a method performing a repair of the subpixel SP illustrated in FIG. 3.

Referring to FIG. 3, the subpixel SP can include the driving transistor DRT and the light-emitting element ED such as an example illustrated in FIG. 2. The subpixel SP can further include the first switching transistor SWT1, the second switching transistor SWT2 and the storage capacitor Cstg.

The subpixel SP can further include an electronic fuse EF electrically connected to the driving transistor DRT.

The electronic fuse EF, for example, such as Case A illustrated in FIG. 3, can be electrically connected between the driving transistor DRT and the light-emitting element ED.

The electronic fuse EF can be electrically connected to the source node of the driving transistor DRT. The electronic fuse EF can be electrically connected to the first electrode E1 of the light-emitting element ED. The electronic fuse EF can be positioned on a path of the driving transistor DRT and the second node N2.

The electronic fuse EF can be a circuit element providing a path that a current supplied through the driving transistor DRT flows between the driving transistor DRT and the light-emitting element ED. The electronic fuse EF can be a circuit element being capable of being open if a high current greater than or equal to a certain level flows.

The electronic fuse EF is not limited to a certain type of circuit element, and can be any one of circuit elements providing a current supplying path between the driving transistor DRT and the light-emitting element ED, and being capable of being open by a high current application.

In the case that the subpixel SP is a normal state, such as described through FIG. 2, the driving transistor DRT can be controlled by the switching transistors SWT1, SWT2. The driving current by the driving transistor DRT can pass the electronic fuse EF and provide to the light-emitting element ED. The light-emitting element ED can represent a luminance corresponding to the image data and an image can be displayed.

In the case that the subpixel SP is a defective state, the light-emitting element ED may not represent a luminance corresponding to the image data accurately.

In this case, a defective state of the subpixel SP can be checked, and a repair using the electronic fuse EF disposed in the subpixel SP can be performed.

Referring to FIG. 4, it can be detected whether the subpixel SP is defective or not in a first period P1. The first period P1 can be referred as "a sensing period".

It can be detected by various methods whether the subpixel SP is defective or not.

For example, when an arrangement of the light-emitting element ED on the subpixel SP is completed, such as <EX 1>, an inspection by a naked eye or a camera can be possible. An inspection method according to <EX 1> can be performed during a manufacturing process of the display device 100 or a driving process of the display device 100.

By an inspection of a method such as <EX 1>, the subpixel SP represented as a dark spot or a bright spot among the subpixels SP disposed in the display panel 110 can be detected.

For another example, such as <EX 2>, it can be detected whether the subpixel SP is defective or not by a method of supplying a certain data voltage to the subpixel SP and sensing a current.

An inspection such as <EX 2> can be performed regardless of an arrangement of the light-emitting element ED when an arrangement of a circuit element such as the thin film transistor in the display panel 110 is completed. An inspection such as <EX 2> can be performed before or after that the light-emitting element ED is disposed during a processing process of the display device 100.

Furthermore, an inspection can be performed such as <EX 2> in a driving process of the display device 100. In this case, an inspection such as <EX 2> can be performed in a state that a power of the display device 100 is off.

In the case that a defect of the subpixel SP is detected by a current sensing such as <EX 2>, a sensing data voltage Vdata_sen can be supplied to the subpixel SP through the data line DL. The sensing data voltage Vdata_sen can be applied to the first node N1 which is the gate node of the driving transistor DRT.

The sensing data voltage Vdata_sen can be a voltage of a certain level configured for detecting whether the subpixel SP is defective. The sensing data voltage Vdata_sen can be a voltage included in a range of the data voltage supplied through the data line DL when display driving.

A voltage lower than the sensing data voltage Vdata_sen can be supplied to the second node N2 which is the source node of the driving transistor DRT in the first period P1. The voltage supplied to the second node N2 can be 0 V. The voltage supplied to the second node N2 can be the reference voltage.

The second electrode E2 of the light-emitting element ED can be floated in the first period P1. The second driving voltage DV2 may not be supplied to the second electrode E2 of the light-emitting element ED in the first period P1.

As, in the first period, the sensing data voltage Vdata_sen is applied to the first node N1 of the driving transistor DRT and a voltage lower than the sensing data voltage Vdata_sen is applied to the second node N2, a sensing current Current_sen can flow through the driving transistor DRT.

The sensing current Current_sen can be detected through the sensing line SL.

The sensing current Current_sen can be detected through the sensing line SL by an analog digital convertor disposed in the data driving circuit 130, or a circuit disposed separately the data driving circuit 130.

The display device 100 can check whether the subpixel SP is defective according to the sensing current Current_sen detected through the sensing line SL in the first period P1.

Checking whether the subpixel SP is defective can be performed by the controller 140, but not limited to this.

The display device 100 can determine that the subpixel SP is defective when the sensing current Current_sen is included in a pre-determined range. The pre-determined range can mean a range deviated from a range that the sensing current Current_sen is normal. For example, the pre-determined range can mean a range smaller than a lowest limit value, or greater than an upper limit value.

The display device 100 can determine that the subpixel SP is a dark spot defect or a bright spot defect when the sensing current Current_sen is included in the pre-determined range.

The display device 100 can perform an operation for repairing the subpixel SP when the subpixel SP which is defective is detected.

Figure 5:
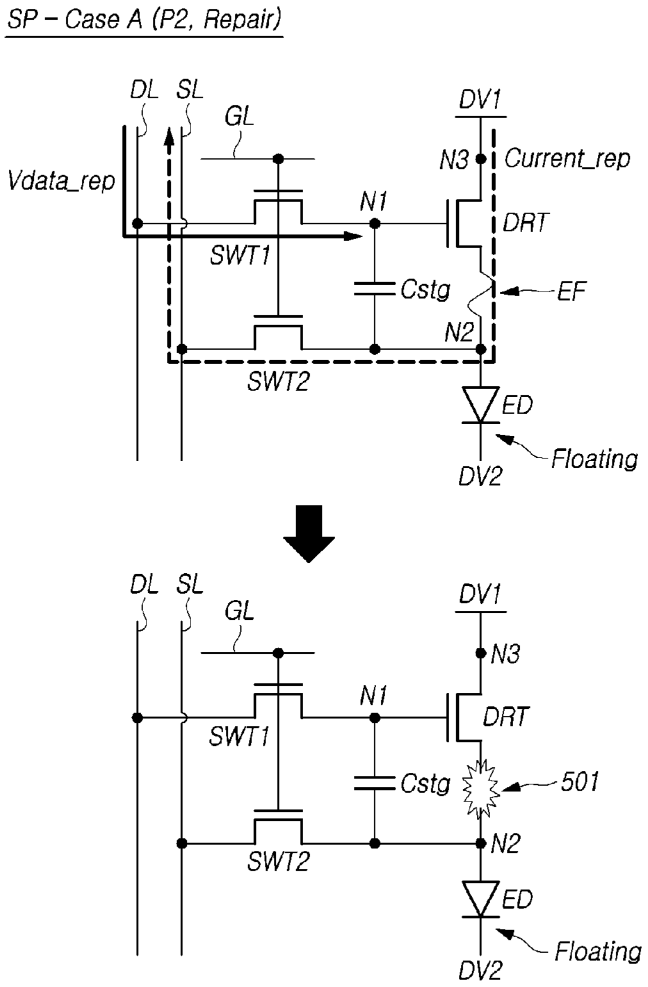

Referring to FIG. 5, an operation for a repair of the subpixel SP which is defective can be performed in a second period P2. The second period P2 can be referred as "a repair period".

A repair data voltage Vdata_rep can be supplied to the data line DL in the second period P2. The repair data voltage Vdata_rep can be applied to the first node N1 of the driving transistor DRT.

The repair data voltage Vdata_rep can be a voltage higher than the sensing data voltage Vdata_sen. The repair data voltage Vdata_rep can be a voltage deviated from a range of the data voltage supplied to the subpixel SP during the display driving. For example, the repair data voltage Vdata_rep can be a voltage having a level greater than an upper limit value of the data voltage supplied during the display driving.

A voltage lower than the repair data voltage Vdata_rep can be supplied to the second node N2 of the driving transistor DRT in the second period P2. The voltage supplied to the second node N2 can be 0V, and can be the reference voltage.

The second electrode E2 of the light-emitting element ED can be floated in the second period P2.

As a voltage is applied to the first node N1 and the second node N2 of the driving transistor DRT, a repair current Current_rep can flow through the driving transistor DRT in the second period P2.

The repair current Current_rep can pass the driving transistor DRT and the electronic fuse EF and flow through the sensing line SL.

As the repair data voltage Vdata_rep which is a high voltage is applied to the first node N1 which is the gate node of the driving transistor DRT, the repair current Current_rep flowing to the subpixel SP can be a high current.

The repair current Current_rep can be a current being capable of making the electronic fuse EF disposed in the subpixel SP open. The repair data voltage Vdata_rep can be configured to a voltage level that makes the repair current Current_rep flow to make the electronic fuse EF open.

As the repair current Current_rep which is a high current flows through the electronic fuse EF, the electronic fuse EF can be open in the second period P2.

By the open of the electronic fuse EF, in the second period, such as a portion indicated by 501, an open section between the driving transistor DRT and the light-emitting element ED can be occurred. The subpixel SP can be darkened.

Such as described above, a repair of the subpixel SP which is defective can be performed through a darkening in the repair period.

Alternatively, in some cases, an operation for the darkening of the subpixel SP which is defective may not be performed in the repair period.

For example, the sensing current Current_sen detected in the first period P1 can be smaller than a pre-determined value. The pre-determined value can be a value smaller than a lowest limit value of the pre-determined range which is a reference for a determination whether the subpixel SP is defective. In this case, the repair data voltage Vdata_rep may not supply to the subpixel SP in the second period P2.

If the sensing current Current_sen detected in the first period P1 is smaller than the pre-determined value, it can be seen that the subpixel SP has been darkened already. Thus, an operation for a repair of the subpixel SP may not be performed in the second period P2.

When a repair of the subpixel SP is completed by abovementioned process, a driving for a compensation of the subpixel SP which is repaired can be performed during the display driving.

Figure 6:
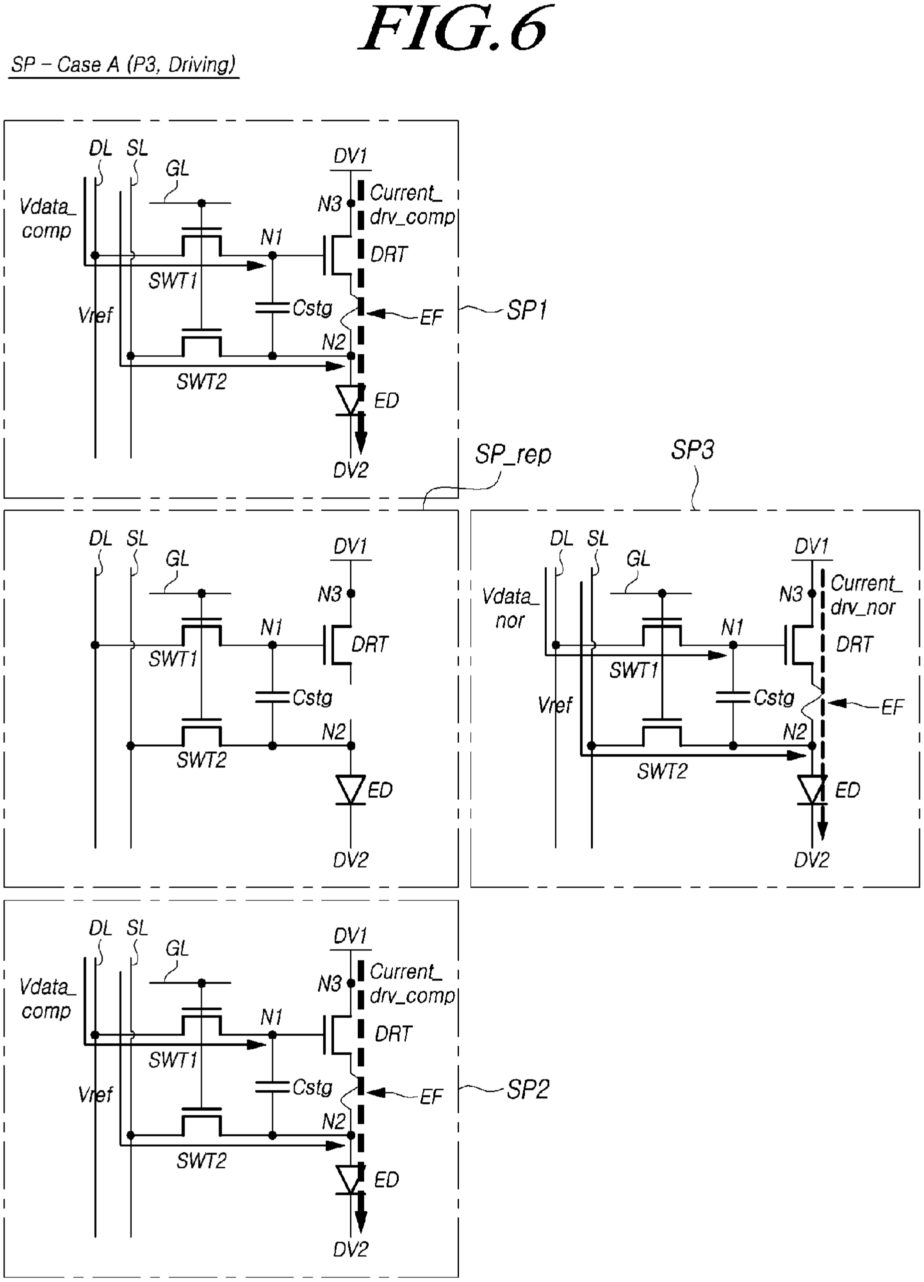

Referring to FIG. 6, it illustrates an example of a method that a repair subpixel SP_rep and subpixels SP1, SP2, SP3 positioned on a periphery of the repair subpixel SP_rep are driven in a third period P3. The third period P3 can be referred as "a display driving period".

The repair subpixel SP_rep may not be driven in the third period P3 since the repair subpixel SP_rep is in a state to have been darkened.

A driving current flowing through the driving transistor DRT of at least one subpixel SP positioned on the periphery of the repair subpixel SP can be increased in the third period P3.

For example, a compensation data voltage Vdata_comp can be supplied to a first subpixel SP1 and a second subpixel SP2 adjacent to the repair subpixel SP_rep through the data line DL. The reference voltage Vref can be supplied to the first subpixel SP1 and the second subpixel SP2 through the sensing line SL.

The first subpixel SP1 and the second subpixel SP2 can be subpixels SP representing an identical color to a color that the repair subpixel SP_rep represents. The compensation data voltage Vdata_comp can be a voltage greater than a voltage corresponding to the image data of the first subpixel SP1 and the second subpixel SP2.

As the compensation data voltage Vdata_comp is supplied to the first subpixel SP1 and the second subpixel SP2 in the third period P3, a compensation driving current Current_drv_comp flowing through the driving transistors DRT disposed on the first subpixel SP1 and the second subpixel SP2 can be a current higher than the driving current corresponding to the image data.

For example, the compensation driving current Current_drv_comp can be a current corresponding to 1.5 times of a current corresponding to a luminance according to the image data of the first subpixel SP1 and the second subpixel SP2, but not limited to this.

As the compensation driving current Current_drv_comp is supplied to the first subpixel SP1 and the second subpixel SP2 positioned on the periphery of the repair subpixel SP_rep, a luminance that the first subpixel SP1 and the second subpixel SP2 represent can be increased.

A compensation for the repair subpixel SP_rep which has been darkened can be performed by a luminance that the first subpixel SP1 and the second subpixel SP2 represent.

Among subpixels SP positioned on the periphery of the repair subpixel SP_rep, the subpixel SP to which the compensation driving current Current_drv_comp is not supplied can be present.

For example, a normal data voltage Vdata_nor can be supplied to a third subpixel SP3 through the data line DL in the third period P3. The reference voltage Vref can be supplied to the third subpixel SP3 through the sensing line SL.

The third subpixel SP3 can be a subpixel SP representing a different color from a color that the repair subpixel SP_rep represents.

As the normal data voltage Vdata_nor is supplied, a normal driving current Current_drv_nor can flow through the driving transistor DRT disposed on the third subpixel SP3. The third subpixel SP3 can represent a luminance corresponding to the image data.

Such as described above, as the compensation driving current Current_drv_comp or the normal driving current Current_drv_nor can flow through the driving transistor DRT in the subpixel SP according to a color that the subpixel SP represents in the subpixels SP positioned on the periphery of the repair subpixel SP_rep, a luminance drop by the repair subpixel SP_rep can be compensated.

The light-emitting element ED and the driving transistor DRT disposed on the first subpixel SP1 and the second subpixel SP2 to which the compensation driving current Current_drv_comp is supplied can be insulated state from the light-emitting element ED disposed on the repair subpixel SP_rep.

For example, the first electrode E1 which is an anode electrode of the light-emitting element ED disposed on the repair subpixel SP_rep can be insulated state from an anode electrode of the light-emitting element ED disposed on the first subpixel SP1 and an anode electrode of the light-emitting element ED disposed on the second subpixel SP2. As the repair subpixel SP_rep is darkened and an electrical connection to adjacent subpixels SP is not required, thus a repair by only the driving of the subpixel SP can be performed.

Thus, the display panel 110 according to aspects of the present disclosure can include a structure that the subpixel SP on which the open electronic fuse EF is disposed and the subpixel SP on which the electronic fuse EF which is not open is disposed are positioned adjacently and the light-emitting elements in two subpixels SP are not electrically connected to each other.

A compensation can be performed that a circuit element disposed on the repair subpixel SP_rep is not electrically connected to a circuit element disposed on an adjacent subpixel SP. In a process that the repair subpixel SP_rep is repaired, a physical repair process may not be required.

As a repair and a compensation of the subpixel SP are performed by a method of driving a circuit of the subpixel SP, a sensing and a repair for a defect of the subpixel SP can be performed more easily.

Figure 7:
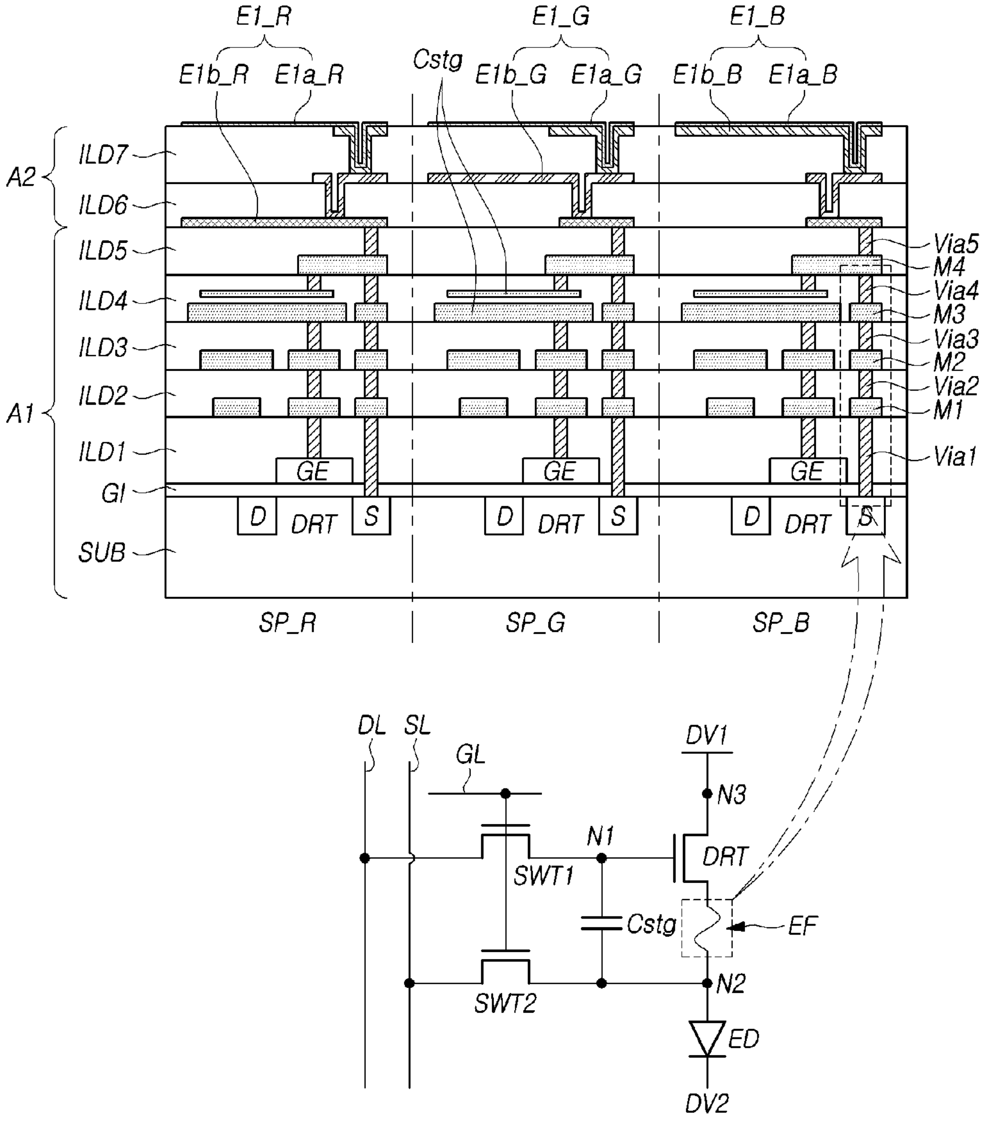
FIG. 7 is a diagram illustrating an example of a cross-sectional structure of a display panel including a subpixel illustrated in FIG. 3.

FIG. 7 is a diagram illustrating an example of a cross-sectional structure of the display panel 110 including the subpixel SP illustrated in FIG. 3. FIG. 7 illustrates only some of circuit elements disposed on the subpixel SP for a convenience of a description.

Referring to FIG. 7, FIG. 7 illustrates an example of cross-sectional structures of a red subpixel SP_R, a green subpixel SP_G and a blue subpixel SP_B. A first area A1 illustrates a portion that a circuit unit including the thin film transistor and the capacitor or the like is disposed. A second area A2 illustrates a portion that the first electrode E1 constituting the light-emitting element ED is disposed.

The driving transistor DRT can be disposed on a substrate SUB. The substrate SUB, for example, can be an opaque substrate. Alternatively, the substrate SUB can be a substrate that a transmittance is low. The substrate SUB can be a substrate made of silicon. As aspects of the present disclosure perform a repair of the subpixel SP by a circuit driving, they can be also applied to the display device 100 including the substrate SUB that a repair by a physical method is not possible.

The driving transistor DRT can include a gate electrode GE, a source node S and a drain node D. A gate insulating layer GI can be disposed between the gate electrode GE and the substrate SUB.

For constituting the circuit unit of the subpixel SP, a plurality of metal layers M can be disposed on the driving transistor DRT on the first area A1. An interlayer insulating layer ILD can be disposed between different metal layers M. A via Via can be formed in the interlayer insulating layer ILD. Different metal layers M can be connected through the via Via. FIG. 7 illustrates an example that four metal layers M1, M2, M3, M4, seven interlayer insulating layers ILD1, ILD2, ILD3, ILD4, ILD5, ILD6, ILD7, and five vias Via1, Via2, Via3, Via4, Via5, but aspects of the present disclosure are not limited to this.

The first electrode E1 constituting the light-emitting element ED can be disposed on the second area A2. The first electrode E1 can be electrically connected to the source node S of the driving transistor DRT by the plurality of metal layers M. The first electrode E1 can have a micro cavity structure for a resonance according to a wavelength of a light that the subpixel SP represents.

For example, the first electrode E1_R, E1_G, E1_B disposed on each subpixel SP_R, SP_G, SP_B can include a first portion E1*a*_R, E1*a*_G, E1*a*_B positioned on a seventh interlayer insulating layer ILD7. The first portion E1*a*_R, E1*a*_G, E1*a*_B of the first electrode E1_R, E1_G, E1_B can be made of a material having a high transmittance.

The first electrode E1_R, E1_G, E1_B can further include a second portion E1*b*_R, E1*b*_G, E1*b*_B. The second portion E1*b*_R, E1*b*_G, E1*b*_B of the first electrode E1_R, E1_G, E1_B can be made of a material having a high reflectance. The second portion E1*b*_R, E1*b*_G, E1*b*_B can be positioned on different layers for each subpixel SP_R, SP_G, SP_B.

For example, the second portion E1*b*_R of the first electrode E1_R disposed on the red subpixel SP_R emitting a red light having the longest wavelength can be positioned under a sixth interlayer insulating layer ILD6. The second portion E1*b*_G of the first electrode E1_G disposed on the green subpixel SP_G can be positioned between the sixth interlayer insulating layer ILD6 and the seventh interlayer insulating layer ILD7. The second portion E1*b*_B of the first electrode E1_B disposed on the blue subpixel SP_B emitting a blue light having the shortest wavelength can be positioned on the seventh interlayer insulating layer ILD7.

The first portion E1*a*_R, E1*a*_G, E1*a*_B of the first electrode E1_R, E1_G, E1_B can be disposed to have substantially identical area to the second portion E1*b*_R, E1*b*_G, E1*b*_B, a resonance efficiency of a light emitted from each light-emitting element ED can be increased and a light-emitting efficiency can be improved.

Each subpixel SP_R, SP_G, SP_B can include the electronic fuse EF for a repair.

The electronic fuse EF can be positioned on a path that the source node S of the driving transistor DRT and the first electrode E1 of the light-emitting element ED are electrically connected. For example, the electronic fuse EF can be positioned in at least one of a plurality of vias Via1, Via2, Via3, Via4 positioned between the substrate SUB and a fourth metal layer M4. Alternatively, in some cases, the electronic fuse EF can be disposed by using a part of the metal layer M.

By arranging the electronic fuse EF when constituting the via Via for a connection between the metal layers M, a structure of the subpixel SP that a repair by a circuit driving can be performed easily can be provided.

Thus, even in a state that a physical repair is not possible after an arrangement of the light-emitting element ED since the circuit element is disposed on a silicon substrate, a repair can be possible by a circuit driving of the subpixel SP.

Furthermore, in some cases, the electronic fuse EF can be positioned on a path other than a path between the source node S of the driving transistor DRT and the first electrode E1 of the light-emitting element ED.

Aspects of the present disclosure can provide a structure of the subpixel SP that a repair is easy by the electronic fuse EF electrically connected to the driving transistor DRT in the subpixel SP, and a position of the electronic fuse EF disposed on the subpixel SP can be various.

Figure 8:
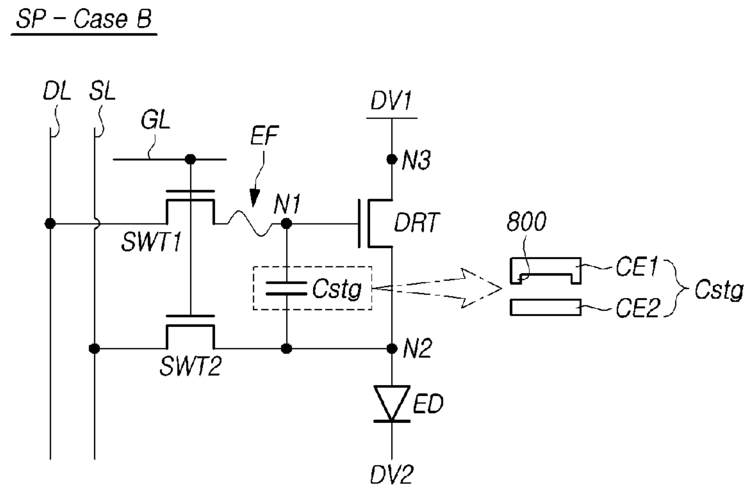
FIG. 8 is a diagram illustrating a still another example of a circuit structure of a subpixel included in a display device according to aspects of the present disclosure.

FIG. 8 is a diagram illustrating a still another example of a circuit structure of the subpixel SP included in the display device 100 according to aspects of the present disclosure.

Figure 9:
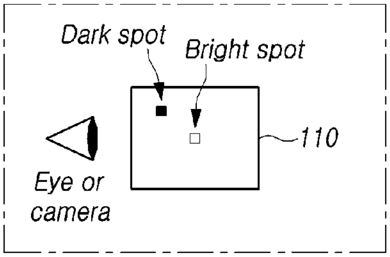
FIGS. 9 to 11 are diagrams illustrating an example of a method performing a repair of a subpixel illustrated in FIG. 8.
Figure 9:
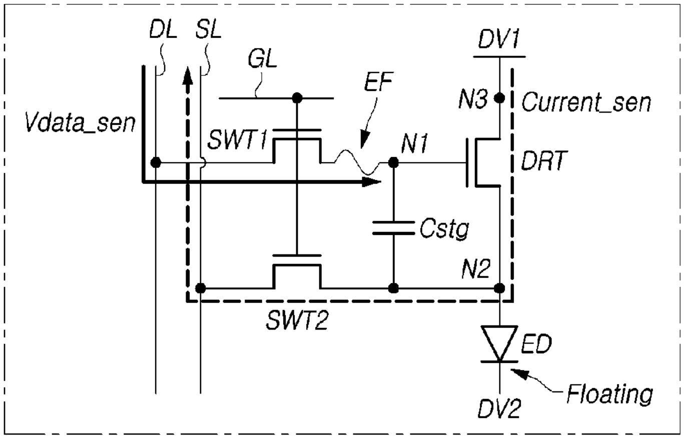
Figure 10:
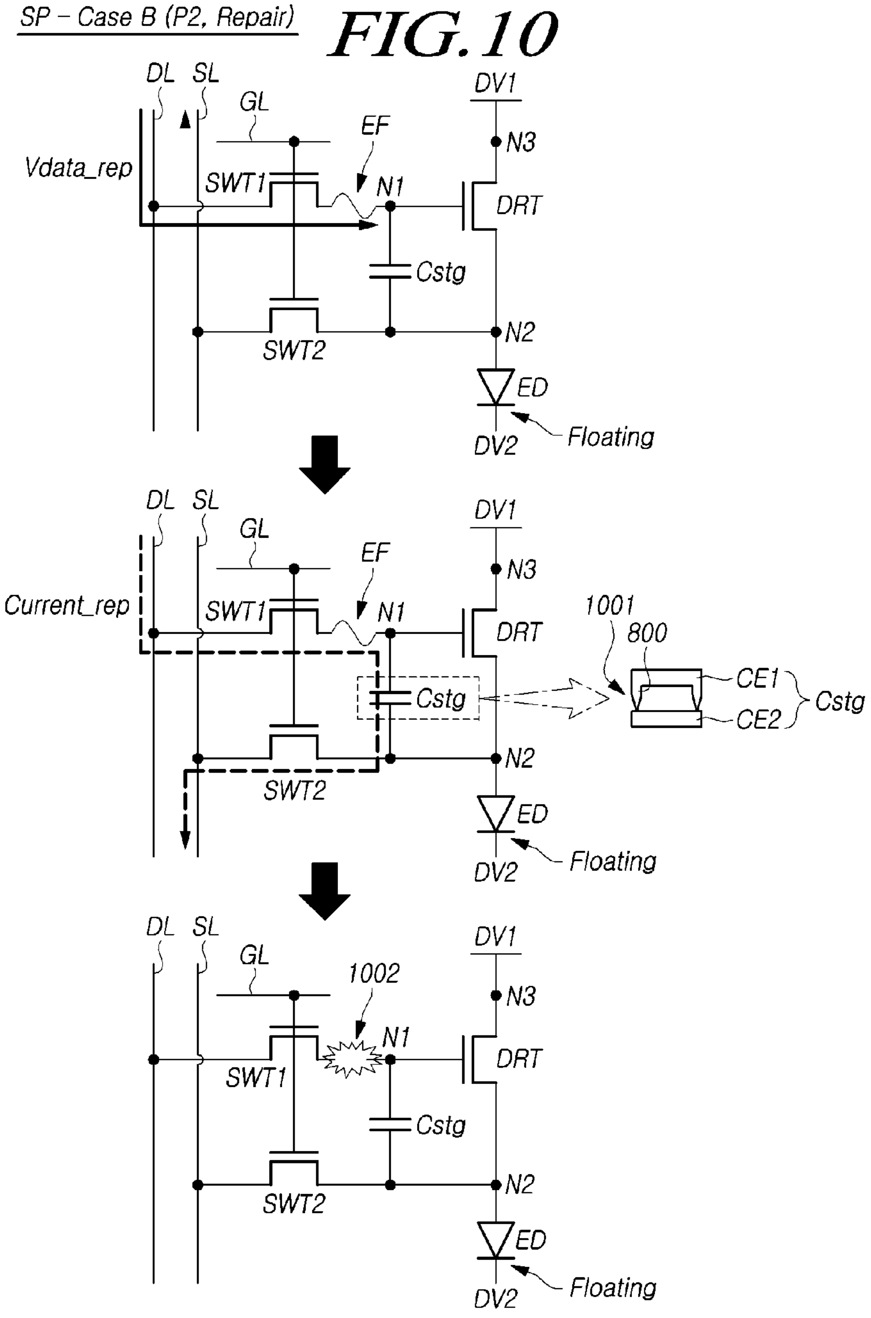
Figure 11:
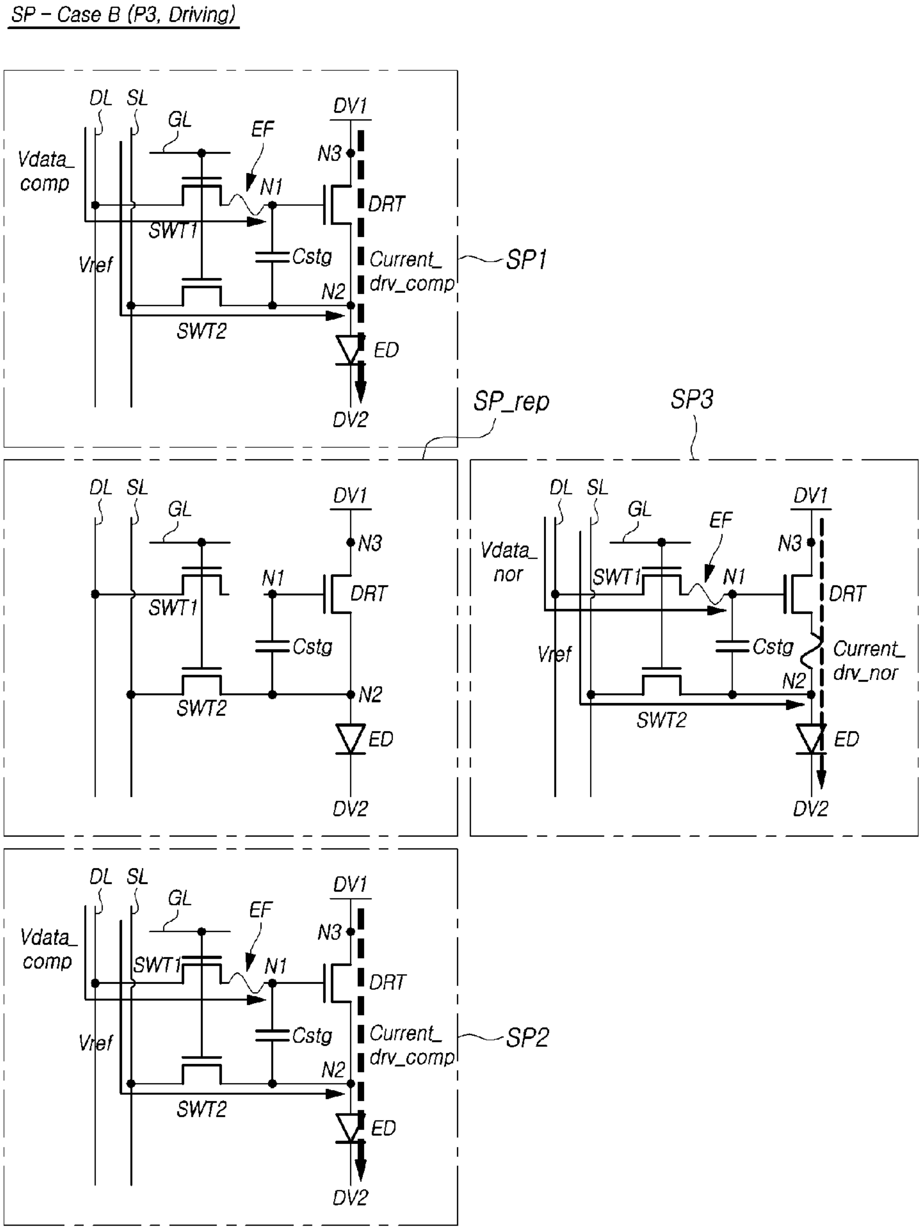

FIGS. 9 to 11 are diagrams illustrating an example of a method performing a repair of the subpixel SP illustrated in FIG. 8.

Referring to FIG. 8, the subpixel SP according to Case B can include the first switching transistor SWT1, the second switching transistor SWT2, the driving transistor DRT, the light-emitting element ED and the storage capacitor Cstg identically to Case A.

The subpixel SP according to Case B can include the electronic fuse EF connected between the driving transistor DRT and the first switching transistor SWT1.

The electronic fuse EF can be electrically connected to the gate node of the driving transistor DRT. The electronic fuse EF can be electrically connected to the drain node of the first switching transistor SWT1.

Even in the case that the electronic fuse EF is electrically connected to the gate node of the driving transistor DRT, a defect detection and a repair of the subpixel SP can be performed as a similar method to Case A above-mentioned.

Referring to FIG. 9, a sensing for detecting a defect of the subpixel SP can be performed in the first period P1 which is the sensing period. Such as <EX 1>, an inspection by a naked eye or a camera can be possible. Furthermore, such as <EX 2>, an inspection by a method of supplying the sensing data voltage Vdata_sen to the subpixel SP and detecting the sensing current Current_sen can be possible.

The sensing data voltage Vdata_sen, similarly to Case A, can be a voltage of an appropriate level for a detection of the sensing current Current_sen without having the open electronic fuse EF.

Referring to FIG. 10, an operation for a repair of the subpixel SP can be performed in the second period P2 which is the repair period.

The repair data voltage Vdata_rep can be supplied to the subpixel SP which is defective through the data line DL in the second period P2. The second electrode E2 of the light-emitting element ED can be floated in the second period P2.

The repair data voltage Vdata_rep can be a voltage of a high level being capable of making the storage capacitor Cstg disposed on the subpixel SP to be shorted circuit.

The repair data voltage Vdata_rep can be a voltage greater than the sensing data voltage Vdata_sen. The repair data voltage Vdata_rep can be a voltage greater than an upper limit value of the data voltage supplied during the display driving.

If the repair data voltage Vdata_rep is supplied to the subpixel SP for a certain period, the storage capacitor Cstg disposed on the subpixel SP can become to be shorted circuit.

When the storage capacitor Cstg becomes to be shorted circuit in a state that the repair data voltage Vdata_rep is applied, a path that a current flows through the storage capacitor Cstg can be formed.

As the repair data voltage Vdata_rep is a voltage of a high level, a high current can flow through the storage capacitor Cstg being shorted circuit.

Thus, such as a portion indicated by 1002, the electronic fuse EF positioned on a path that the high current flows can be open.

After the storage capacitor Cstg becomes to be shorted circuit by an application of a high voltage, the electronic fuse EF connected between the first switching transistor SWT1 and the first node N1 can be open by that the high current flows.

The subpixel SP which is defective can be darkened by the open electronic fuse EF and a repair of the subpixel SP which is defective can be performed.

The storage capacitor Cstg can have a structure for being shorted circuit easily when an application of the high voltage.

For example, such as illustrated in FIG. 8, the storage capacitor Cstg can include a first capacitor electrode CE1 electrically connected to the first node N1 and a second capacitor electrode CE2 electrically connected to the second node N2.

At least one of the first capacitor electrode CE1 or the second capacitor electrode CE2 can include at least one protrusion 800 protruded toward another.

An example illustrated in FIG. 8 illustrates an example that the first capacitor electrode CE1 include the protrusion 800 protruded toward the second capacitor electrode CE2, but not limited to this.

As the first capacitor electrode CE1 include the protrusion 800, when the high voltage is applied to the storage capacitor Cstg, a shorted circuit of the storage capacitor Cstg can be performed easily.

For example, such as a portion indicated by 1001 illustrated in FIG. 10, the protrusion 800 of the first capacitor electrode CE1 can be connected to the second capacitor electrode CE2 due to an application of the high voltage.

As the first capacitor electrode CE1 and the second capacitor electrode CE2 become to be shorted circuit, the high current can flow through the electronic fuse EF and the storage capacitor Cstg. And the electronic fuse EF can be open, and a repair by darkening of the subpixel SP can be performed easily.

Referring to FIG. 11, a driving for a compensation of the repair subpixel SP_rep can be performed similarly to Case A in the third period P3 which is the display driving period.

The compensation data voltage Vdata_comp greater than a voltage corresponding to the image data can be supplied to the subpixels SP1, SP2 which represent an identical color to the repair subpixel SP_rep.

The normal data voltage Vdata_nor corresponding to the image data can be supplied to the subpixel SP3 which represents a different color from the repair subpixel SP_rep.

The light-emitting element ED of the repair subpixel SP_rep can maintain a state not electrically connected to the circuit element in a peripheral subpixel SP.

Such as described above, even in the case that the electronic fuse EF is electrically connected to the gate node of the driving transistor DRT, a defect detection and a repair by a circuit driving of the subpixel SP can be possible.

Figure 12:
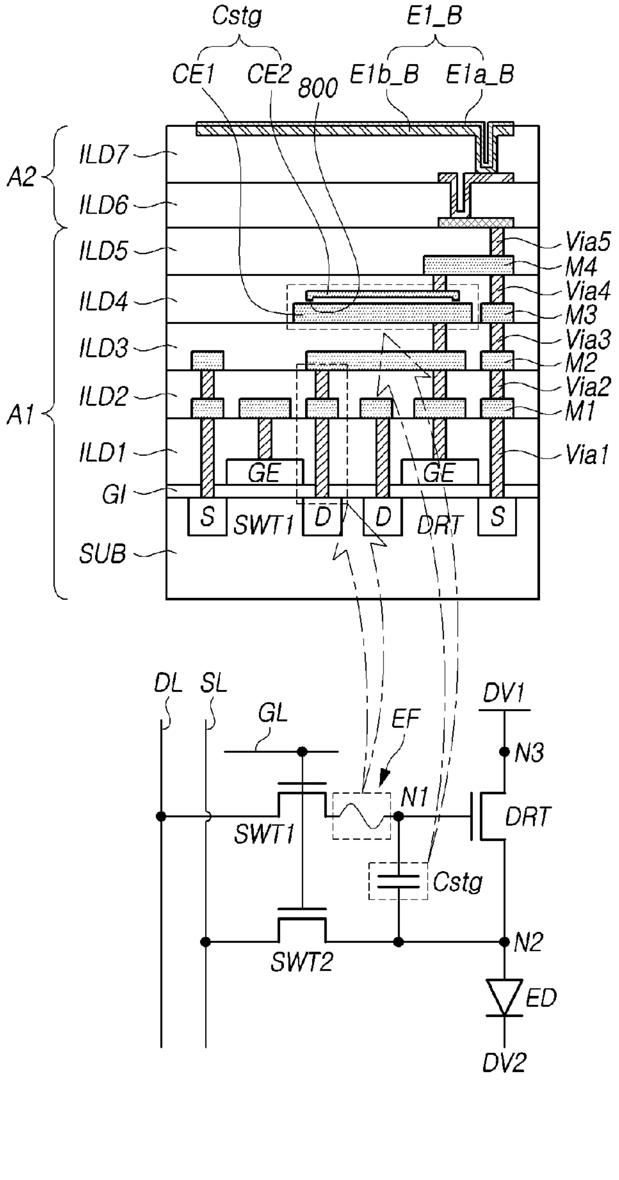
FIG. 12 is a diagram illustrating an example of a cross-sectional structure of a display panel including a subpixel illustrated in FIG. 8.

FIG. 12 is a diagram illustrating an example of a cross-sectional structure of the display panel 110 having a circuit structure of the subpixel SP illustrated in FIG. 8. FIG. 12 illustrates only some of circuit elements disposed on the subpixel SP for a convenience of a description.

Referring to FIG. 12, the first switching transistor SWT1 and the driving transistor DRT can be disposed on the substrate SUB. A plurality of metal layers M can be disposed on the first switching transistor SWT1 and the driving transistor DRT. The interlayer insulating layer ILD can be disposed between different metal layers M. The via Via can be formed in the interlayer insulating layer ILD. Different metal layers M can be connected through the via Via. FIG. 12 illustrates an example that four metal layers M1, M2, M3, M4, seven interlayer insulating layers ILD1, ILD2, ILD3, ILD4, ILD5, ILD6, ILD7, and five vias Via1, Via2, Via3, Via4, Via5 are disposed, but aspects of the present disclosure are not limited to this.

The first switching transistor SWT1 can be electrically connected to the gate electrode GE of the driving transistor DRT and the first capacitor electrode CE1 of the storage capacitor Cstg through the plurality of metal layers M and the plurality of vias Via.

The electronic fuse EF can be positioned on a path that a drain node D of the first switching transistor SWT1 and the first capacitor electrode CE1 are connected.

An example illustrated in FIG. 12 illustrates an example that the second capacitor electrode CE2 included in the storage capacitor Cstg includes the protrusion 800.

When the high voltage is applied for a repair of a defective subpixel SP, the first capacitor electrode CE1 and the second capacitor electrode CE2 of the storage capacitor Cstg can become to be shorted circuit. The high current can flow through the first switching transistor SWT1 and the storage capacitor Cstg by the shorted circuit of the storage capacitor Cstg, and the electronic fuse EF positioned on a path that the high current flows can be open.

Thus, even in the case that the electronic fuse EF is electrically connected between the first switching transistor SWT1 and the driving transistor DRT, a defect detection and a repair of the subpixel can be performed easily by a circuit driving.

The aspects of the present disclosure described above will be briefly described as follows.

A display device 100 according to aspects of the present disclosure can include a plurality of subpixels SP disposed on an active area AA of a display panel 110, a light-emitting element ED disposed on each of the plurality of subpixels SP and including a first electrode E1 and a second electrode E2, a driving transistor DRT configured to control a driving current supplied to the light-emitting element ED, and an electronic fuse EF electrically connected between the driving transistor DRT and the first electrode E1 of the light-emitting element ED.

The electronic fuse EF disposed on at least one subpixel SP of the plurality of subpixels SP can be open.

A compensation data voltage Vdata_comp greater than a voltage corresponding to an image data can be configured to be supplied to at least one subpixel SP positioned on a periphery of a subpixel SP on which the open electronic fuse EF is disposed.

A color that a subpixel SP to which the compensation data voltage Vdata_comp is supplied represents can be identical to a color that a subpixel SP on which the open electronic fuse EF is disposed represents.

The first electrode E1 of the light-emitting element ED disposed on a subpixel SP to which the compensation data voltage Vdata_comp is supplied can be insulated from the first electrode E1 of the light-emitting element ED disposed on a subpixel SP on which the open electronic fuse EF is disposed.

A normal data voltage Vdata_nor corresponding to an image data can be configured to be supplied to at least one subpixel SP positioned on a periphery of a subpixel SP on which the open electronic fuse EF is disposed.

In a first period P1, a sensing data voltage Vdata_sen can be configured to be supplied to a gate node of the driving transistor DRT disposed on at least one subpixel SP of the plurality of subpixels SP and a sensing current Current_sen which flows on a node between the driving transistor DRT and the first electrode E1 of the light-emitting element ED can be configured to be detected.

The second electrode E2 of the light-emitting element ED can be configured to be floated in the first period P1.

If the sensing current Current_sen is included in a pre-determined range, in a second period P2 after the first period P1, a repair data voltage Vdata_rep greater than the sensing data voltage Vdata_sen can be configured to be supplied to the gate node of the driving transistor DRT disposed on a subpixel SP that the sensing current Current_sen is detected.

The second electrode E2 of the light-emitting element ED can be configured to be floated in the second period P2.

If the sensing current Current_sen is smaller than a pre-determined value, in the second period P2, the repair data voltage Vdata_rep can be configured not to be supplied to a subpixel SP that the sensing current Current_sen is detected.

After the second period P2, the electronic fuse EF disposed on the subpixel SP to which the repair data voltage Vdata_rep is supplied can be open.

The driving transistor DRT and the light-emitting element ED can be disposed on an opaque substrate.

A display device 100 according to aspects of the present disclosure can include a plurality of subpixels SP disposed on an active area AA of a display panel 110, a light-emitting element ED disposed on each of the plurality of subpixels SP, a driving transistor DRT configured to control a driving current supplied to the light-emitting element ED, a capacitor including a first capacitor electrode CE1 electrically connected to a gate node of the driving transistor DRT and a second capacitor electrode CE2 electrically connected to a source node of the driving transistor DRT, and an electronic fuse EF electrically connected to the gate node of the driving transistor DRT.

At least one of the first capacitor electrode CE1 or the second capacitor electrode CE2 of the capacitor can include at least one protrusion 800 protruded toward another.

The first capacitor electrode CE1 and the second capacitor electrode CE2 of the capacitor disposed on some subpixels SP of the plurality of subpixels SP can be shorted circuit.

The electronic fuse EF disposed on the some subpixels SP where the first capacitor electrode CE1 and the second capacitor electrode CE2 of the capacitor are disposed to be shorted circuit can be open.

A compensation data voltage Vdata_comp greater than a voltage corresponding to an image data can be configured to be supplied to at least one subpixel SP positioned on a periphery of a subpixel SP on which the open electronic fuse EF is disposed.

A sensing data voltage Vdata_sen can be configured to be supplied to the gate node of the driving transistor DRT disposed on at least one subpixel SP of the plurality of subpixels SP in a first period P1, and a repair data voltage Vdata_rep greater than the sensing data voltage Vdata_sen can be configured to be supplied to the gate node of the driving transistor DRT in a second period P2 after the first period P1.

A display device 100 according to aspects of the present disclosure can include a first subpixel including a first light-emitting element, a first driving transistor configured to drive the first light-emitting element, and a first electronic fuse electrically connected to the first driving transistor, and a second subpixel including a second light-emitting element, a second driving transistor configured to drive the second light-emitting element, and a second electronic fuse electrically connected to the second driving transistor and being open, wherein an anode electrode of the second light-emitting element is insulated from an anode electrode of the first light-emitting element.

According to aspects of the present disclosure, by using the electronic fuse EF electrically connected to the driving transistor DRT disposed on the subpixel SP, a defect detection and a repair of the subpixel SP can be performed easily.

As using the electronic fuse EF disposed on the subpixel SP, a defect detection and a repair by a circuit driving of the subpixel SP can be possible.

Thus, even in the case that a physical repair is not possible according to types of the display panel 110, the display device 100 being capable of detecting and repairing a defect of the subpixel SP easily and preventing a drop of a display quality due to the defect of the subpixel SP can be provided.

The above description has been presented to enable any person skilled in the art to make and use the technical idea of the present disclosure, and has been provided in the context of a particular application and its requirements. Various modifications, additions and substitutions to the described aspects will be readily apparent to those skilled in the art, and the general principles defined herein may be applied to other aspects and applications without departing from the spirit and scope of the present disclosure. The above description and the accompanying drawings provide an example of the technical idea of the present disclosure for illustrative purposes only. That is, the disclosed aspects are intended to illustrate the scope of the technical idea of the present disclosure. Thus, the scope of the present disclosure is not limited to the aspects shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A display device, comprising:

a plurality of subpixels disposed on an active area of a display panel; and a light-emitting element disposed on each of the plurality of subpixels and having a first electrode and a second electrode;

wherein a first light-emitting element disposed in a first subpixel comprises:

a driving transistor configured to control a driving current supplied to the light-emitting element;

an electronic fuse electrically connected between the driving transistor and the first electrode of the light-emitting element; and a capacitor having a first capacitor electrode electrically connected to a gate node of the driving transistor and a second capacitor electrode electrically connected to the light-emitting element, wherein one end of the electronic fuse is electrically connected to the second capacitor electrode and the light-emitting element, and another end of the electronic fuse is electrically connected to the driving transistor, and wherein the electronic fuse is disposed in a via amongst a stack of vias that are stacked between a source node of the driving transistor and the first electrode.

2. The display device of claim 1, wherein the electronic fuse disposed on at least one subpixel of the plurality of subpixels is open.

3. The display device of claim 2, wherein a compensation data voltage greater than a voltage corresponding to an image data is supplied to at least one subpixel positioned on a periphery of a subpixel on which the open electronic fuse is disposed.

4. The display device of claim 3, wherein a color represented by a subpixel to which the compensation data voltage is supplied is identical to a color represented by a subpixel on which the open electronic fuse is disposed.

5. The display device of claim 3, wherein the first electrode of the light-emitting element disposed on a subpixel to which the compensation data voltage is supplied is insulated from the first electrode of the light-emitting element disposed on a subpixel on which the open electronic fuse is disposed.

6. The display device of claim 2, wherein a normal data voltage corresponding to an image data is supplied to at least one subpixel positioned on a periphery of a subpixel on which the open electronic fuse is disposed.

7. The display device of claim 1, wherein, during a first period, a sensing data voltage is supplied to a gate node of the driving transistor disposed on at least one subpixel of the plurality of subpixels and a sensing current which flows on a node between the driving transistor and the first electrode of the light-emitting element is detected.

8. The display device of claim 7, wherein the second electrode of the light-emitting element is floated during the first period.

9. The display device of claim 7, wherein, when the sensing current is included in a pre-determined range, during a second period after the first period, a repair data voltage greater than the sensing data voltage is supplied to the gate node of the driving transistor disposed on a subpixel that the sensing current is detected.

10. The display device of claim 9, wherein the second electrode of the light-emitting element is floated during the second period.

11. The display device of claim 9, wherein, when the sensing current is smaller than a pre-determined value, the repair data voltage is not supplied to a subpixel that the sensing current is detected during the second period.

12. The display device of claim 9, wherein, after the second period, the electronic fuse disposed on the subpixel to which the repair data voltage is supplied is open.

13. The display device of claim 1, wherein the driving transistor and the light-emitting element are disposed on an opaque substrate.

14. A display device, comprising:

a first subpixel comprising a first light-emitting element, a first driving transistor configured to drive the first light-emitting element, and a first electronic fuse electrically connected to the first driving transistor;

a second subpixel comprising a second light-emitting element, a second driving transistor configured to drive the second light-emitting element, and a second electronic fuse being open and electrically connected to the second driving transistor; and a capacitor having a first capacitor electrode electrically connected to a gate node of the first driving transistor or the second driving transistor and a second capacitor electrode electrically connected to the first light-emitting element or the second light-emitting element, wherein the second light-emitting element has an anode electrode that is insulated from an anode electrode of the first light-emitting element, wherein one end of the first electronic fuse or the second electronic fuse is electrically connected to the second capacitor electrode and the first light-emitting element or the second light-emitting element, and another end of the first electronic fuse or the second electronic fuse is electrically connected to the first driving transistor or the second driving transistor, and wherein the second electronic fuse is disposed in a via amongst a stack of vias that are stacked between a source node of the second driving transistor and the second light-emitting element.

* * * * *